(12) United States Patent
Ogami

(10) Patent No.: US 7,461,567 B2
(45) Date of Patent: Dec. 9, 2008

(54) SHIFT OPERATING APPARATUS

(75) Inventor: Shiro Ogami, Kariya (JP)

(73) Assignee: Aisin AI Co., Ltd., Nishio-Shi, Aichi-Ken (JP)

( * ) Notice: Subject to any disclaimer, the term of this patent is extended or adjusted under 35 U.S.C. 154(b) by 412 days.

(21) Appl. No.: 11/412,822

(22) Filed: Apr. 28, 2006

(65) Prior Publication Data

US 2006/0266141 A1 Nov. 30, 2006

(30) Foreign Application Priority Data

May 25, 2005 (JP) ............................. 2005-151807

(51) Int. Cl.
*F16H 61/28* (2006.01)
*F16H 3/08* (2006.01)
(52) U.S. Cl. ................. 74/330; 74/335; 74/473.25; 74/473.36
(58) Field of Classification Search ............ 74/340, 74/473.25, 473.36, 473.37
See application file for complete search history.

(56) References Cited

U.S. PATENT DOCUMENTS 3,513,717 A * 5/1970 Lickey et al. ............ 74/473.26
4,771,648 A  9/1988 Bardoll
6,845,685 B2 * 1/2005 Brandwitte et al. ...... 74/473.25
2003/0121343 A1 * 7/2003 Berger et al. ................. 74/340

FOREIGN PATENT DOCUMENTS

| DE | 35 30 017 A1 | 2/1987 |
| EP | 0 034 411 A2 | 8/1981 |
| JP | 56-127842 | 6/1981 |
| WO | WO 01/84019 A1 | 11/2001 |

* cited by examiner

*Primary Examiner*—Richard M. Lorence
*Assistant Examiner*—Edwin A. Young
(74) *Attorney, Agent, or Firm*—Buchanan Ingersoll & Rooney PC

(57) ABSTRACT

A shift operating apparatus includes a shift and select shaft moved in an axial direction upon a shift operation and rotated about an axis upon a select operation, an inner lever provided at the shift and select shaft, the inner lever being moved in the axial direction upon the shift operation and being rotatable about the axis upon the select operation, a plurality of shift fork heads arranged about the axis along a circumferential direction of the shift and select shaft; and plural shift grooves formed at the inner lever to be open in the circumferential direction of the shift and select shaft. The plural shift grooves are arranged along the axial direction with an interval relative to an adjacent shift groove of each other, the interval which corresponds to an amount of a shift stroke.

15 Claims, 8 Drawing Sheets

1st or 3rd shift stage selected

2nd or 4th shift stage selected

5th or 7th shift stage selected

6th or R shift stage selected

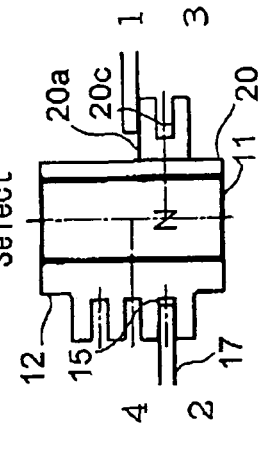
FIG. 5A Neutral
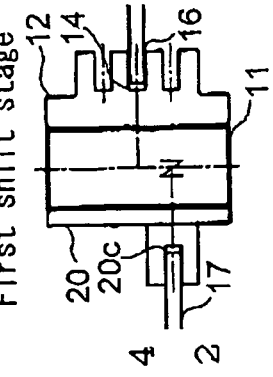
FIG. 5B First shift stage
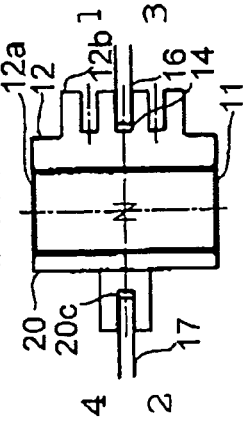
FIG. 5C Select
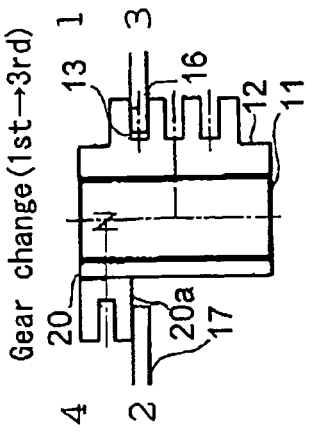
FIG. 5D Second shift stage
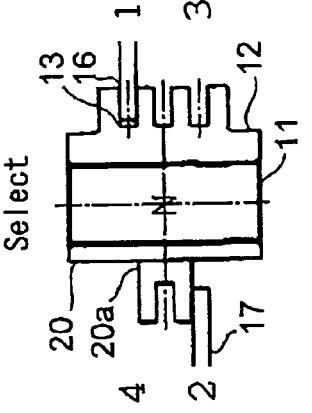
FIG. 5E Select
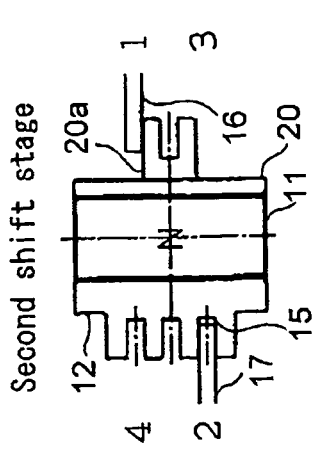
FIG. 5F Gear change (1st→3rd)
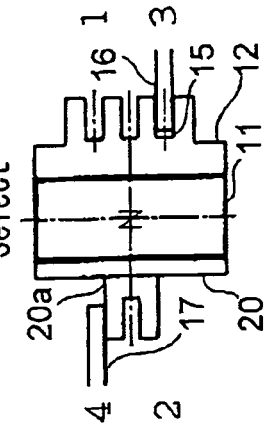
FIG. 5G Select
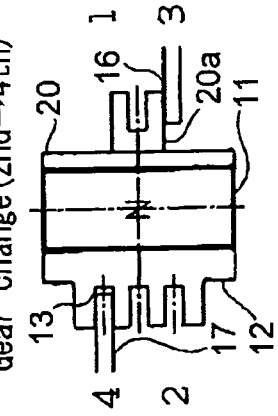
FIG. 5H Gear change (2nd→4th)
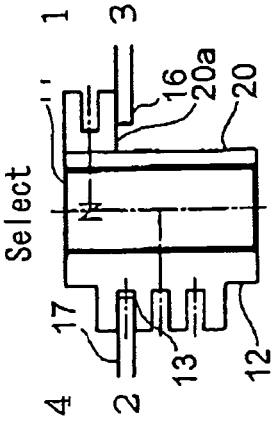
FIG. 5I Select

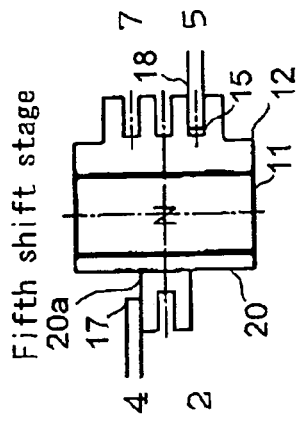
FIG. 5J Neutral
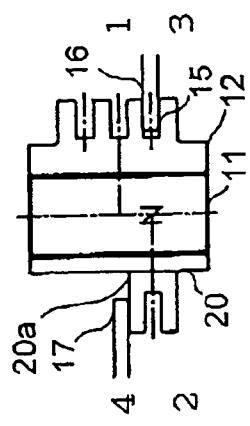
FIG. 5K Select
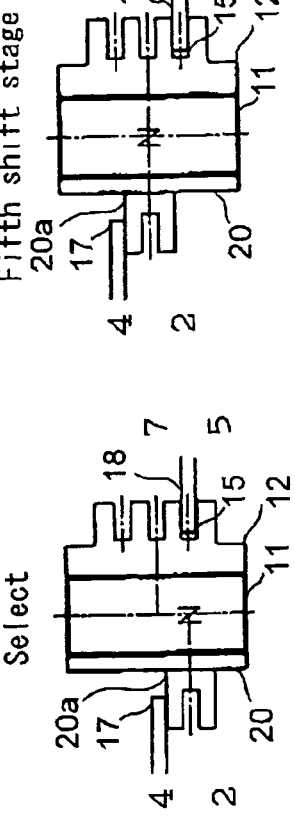
FIG. 5L Fifth shift stage
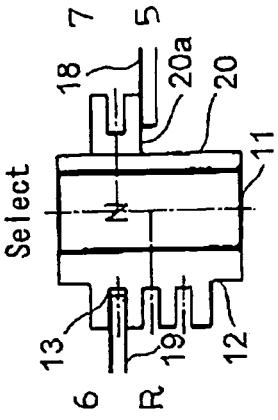
FIG. 5M Select
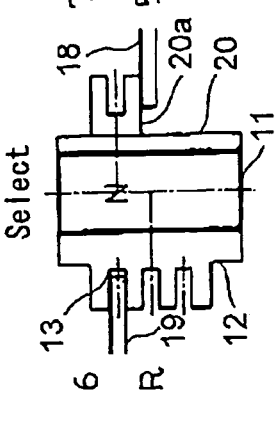
FIG. 5N Neutral
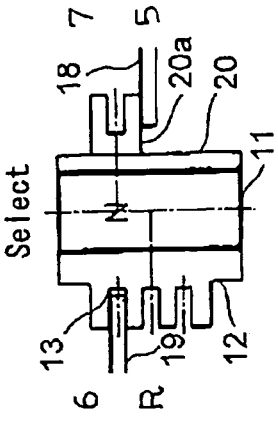
FIG. 5O Select
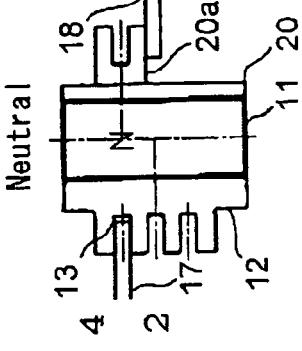
FIG. 5P Sixth shift stage
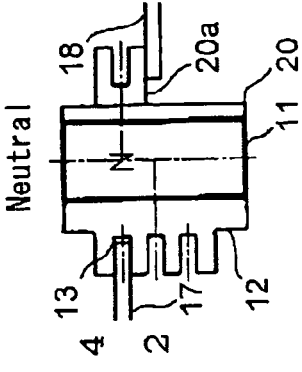
FIG. 5Q Select
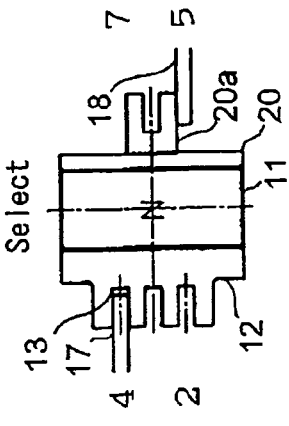
FIG. 5R Gear change (5th→7th)
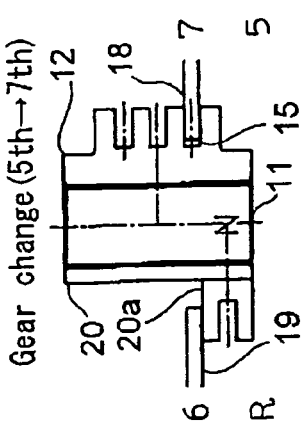
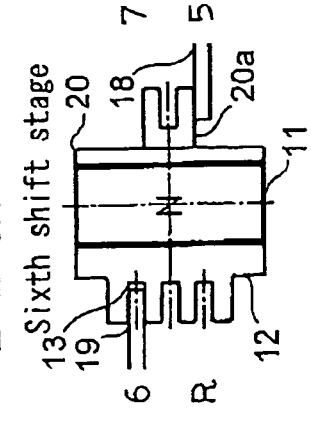

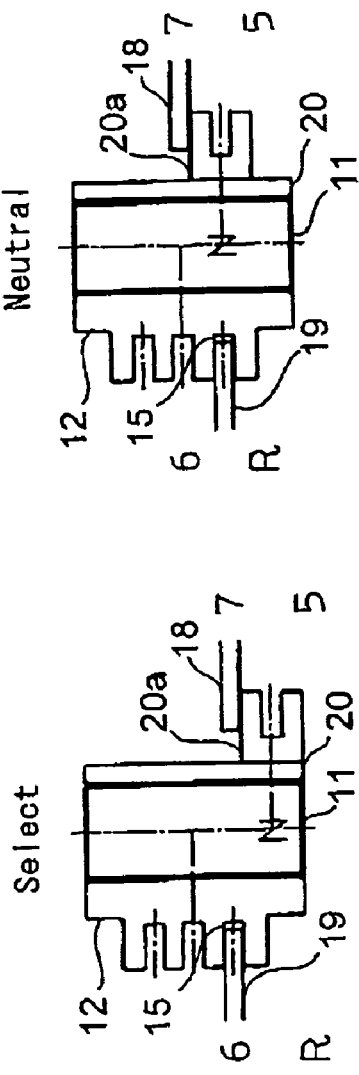
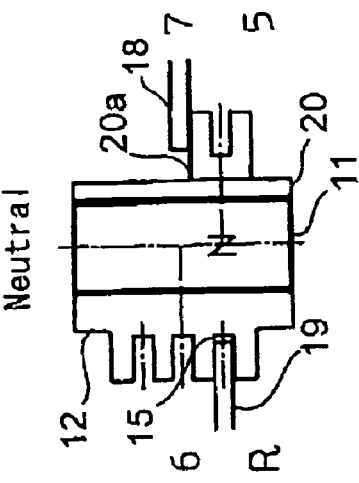
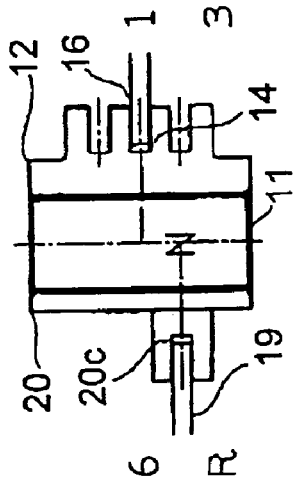
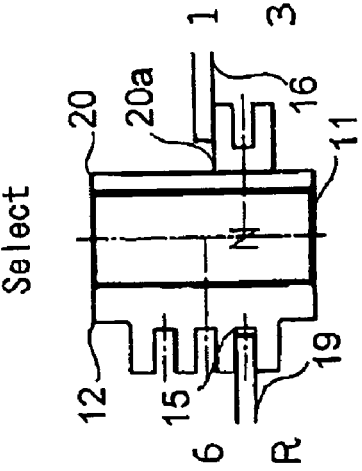
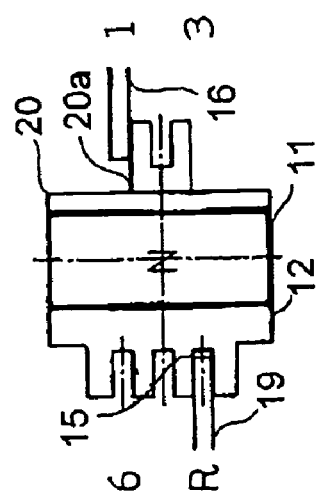

Direct shift

Indirect shift

SHIFT OPERATING APPARATUS

This application is based on and claims priority under 35 U.S.C. § 119 to Japanese Patent Application 2005-151807, filed on May 25, 2005 the entire content of which is incorporated herein by reference.

FIELD OF THE INVENTION

This invention relates to a shift operating apparatus applicable for a manual transmission. More particularly, the present invention pertains to a shift operating apparatus applicable for an automated synchromesh type manual transmission. The manual transmission, more particularly the automated synchromesh type manual transmission, can be provided with plural clutches.

BACKGROUND

In view of improving a fuel efficiency, a power performance, or the like, of a vehicle, a development of a transmission or an automated transmission apparatus has been preceding based on a conventional synchromesh type manual transmission.

JP1981(56)-127842A (see FIG. 1, corresponding to EP0034411A3) and DE3530017A1 respectively disclose a transmission which includes two clutch mechanisms (first and second clutches) for transmitting a power to a transmission from an engine, and includes plural input shafts (first and second input shafts) of the transmission. With the configuration of each disclosed transmission, the power can be transmitted to the first input shaft from the first clutch, and the power can be transmitted to the second input shaft from the second clutch. Further, the first input shaft is provided with gears for first, third, and fifth shift stages, and the second input shaft is provided with gears for second, fourth, and sixth shift stages.

A shift operating apparatus is disclosed in WO01/84019A1 (see FIGS. 1a and 2, and columns [0034]-[0040] of a corresponding publication No. US2003/0121343A1), which includes a shift and select shaft, an inner lever (i.e., a selector) provided on the shift and select shaft, and plural shift grooves (i.e., shift fork openings) respectively provided on plural shift forks. The shift and select shaft is rotated about an axis upon a shift operation and is linearly moved in an axial direction upon a select operation. The inner lever is rotated about the axis upon a shift operation and is linearly moved in the axial direction upon a select operation. Each shift groove is engaged with a head portion of the inner lever so as to establish a predetermined shift stage. A shift-directional dimension of a recess of each shift groove is designed greater than a shift-directional dimension of the head portion of the inner lever, so that a large clearance is ensured between the head portion of the inner lever and the recess of each shift groove in the shift direction. According to the disclosed shift operating apparatus, a synchromesh mechanism of a transmission is operated in response to a shift stroke of a selected shift fork, and a predetermined gear is rotated in sync with a predetermined shaft.

A shift-directional dimension of the aforementioned clearance is formed greater than the shift stroke of each shift fork in order to prevent interference between the head portion of the inner lever and a jaw or edge portion of the shift groove at a time when the inner lever moves across the shift grooves upon a select operation.

However, according to the shift operating apparatus disclosed in US2003/0121343A1, when a direct shift operation, by which a shift change is implemented by engageably operating only one synchromesh mechanism, is performed as illustrated in FIG. 6A, the head portion of the inner lever runs a long distance until the head portion contacts with an inner wall of the shift groove. In other words, a long and idle running time is required. Further, when an indirect shift operation, by which a shift change is implemented by engageably operating plural synchromesh mechanisms, is performed as illustrated in FIG. 6B, a long and idle running time is required at the time of returning to a neutral position from a shift stage and at a time of a shift movement to another shift stage. Accordingly, the disclosed shift operating apparatus may take a time to complete a shift operation.

A need thus exists to provide a shift operating apparatus, which can reduce a time required for a shift operation to establish a predetermined shift stage. The shift operating apparatus can be applied to a synchromesh type manual transmission or an automated synchromesh type manual transmission. More particularly, the shift operating apparatus can be applied to an automated synchromesh type transmission with plural clutches.

SUMMARY OF THE INVENTION

According to an aspect of the present invention, a shift operating apparatus includes a shift and select shaft moved in an axial direction upon a shift operation and rotated about an axis upon a select operation, an inner lever provided at the shift and select shaft, the inner lever being moved in the axial direction upon the shift operation and being rotatable about the axis upon the select operation, a plurality of shift fork heads arranged about the axis along a circumferential direction of the shift and select shaft with a predetermined interval relative to an adjacent shift fork head of each other, and plural shift grooves formed at the inner lever to be open in the circumferential direction of the shift and select shaft, a shift groove from among the plural shift grooves being engageable with a corresponding shift fork head from among the shift fork heads in response to a selected shift stage, and the engagement between the shift groove and the corresponding shift fork head configured to be released when the inner lever is rotated about the axis in response to the select operation. The plural shift grooves are arranged along the axial direction with an interval relative to an adjacent shift groove of each other, the interval which corresponds to an amount of a shift stroke.

BRIEF DESCRIPTION OF THE DRAWINGS

The foregoing and additional features and characteristics of the present invention will become more apparent from the following detailed description considered with reference to the accompanying drawings, wherein:

FIG. 5A is a schematic view of the shift operating apparatus in a condition of neutral;

FIG. 5B is a schematic view of the shift operating apparatus in a condition where a first shift stage is established;

FIG. 5C is a schematic view of the shift operating apparatus in a condition where the second and fourth shift fork head is selected;

FIG. 5D is a schematic view of the shift operating apparatus in a condition where a second shift stage is established;

FIG. 5E is a schematic view of the shift operating apparatus in a condition where the first and third shift stage shift fork head is selected;

FIG. 5F is a schematic view of the shift operating apparatus in a condition where a third shift stage is established;

FIG. 5G is a schematic view of the shift operating apparatus in a condition where the second and fourth shift stage shift fork head is selected;

FIG. 5H is a schematic view of the shift operating apparatus in a condition where a fourth shift stage is established;

FIG. 5I is a schematic view of the shift operating apparatus in a condition where the first and third shift stage shift fork head is selected;

FIG. 5J is a schematic view of the shift operating apparatus in a condition where the first and third shift stage shift fork head is shifted to a neutral position;

FIG. 5K is a schematic view of the shift operating apparatus in a condition where the fifth and seventh shift stage shift fork head is selected;

FIG. 5L is a schematic view of the shift operating apparatus in a condition where a fifth shift stage is established;

FIG. 5M is a schematic view of the shift operating apparatus in a condition where the second and fourth shift stage shift fork head is selected;

FIG. 5N is a schematic view of the shift operating apparatus in a condition where the second and fourth shift stage shift fork head is shifted to a neutral position;

FIG. 5O is a schematic view of the shift operating apparatus in a condition where the sixth and reverse shift stage shift fork head is selected;

FIG. 5P is a schematic view of the shift operating apparatus in a condition where a sixth shift stage is established;

FIG. 5Q is a schematic view of the shift operating apparatus in a condition where the fifth and seventh shift stage shift fork head is selected;

FIG. 5R is a schematic view of the shift operating apparatus in a condition where a seventh shift stage is established;

FIG. 5S is a schematic view of the shift operating apparatus in a condition where the sixth and reverse shift fork head is selected;

FIG. 5T is a schematic view of the shift operating apparatus in a condition where the sixth and reverse shift fork head is shifted to a neutral position;

FIG. 5U is a schematic view of the shift operating apparatus in a condition where the first shift stage is established;

FIG. 5V is a schematic view of the shift operating apparatus in a condition where the sixth and reverse shift stage shift fork head is selected;

FIG. 5W is a schematic view of the shift operating apparatus in a condition where a reverse shift stage is established;

DETAILED DESCRIPTION

Figure 1:
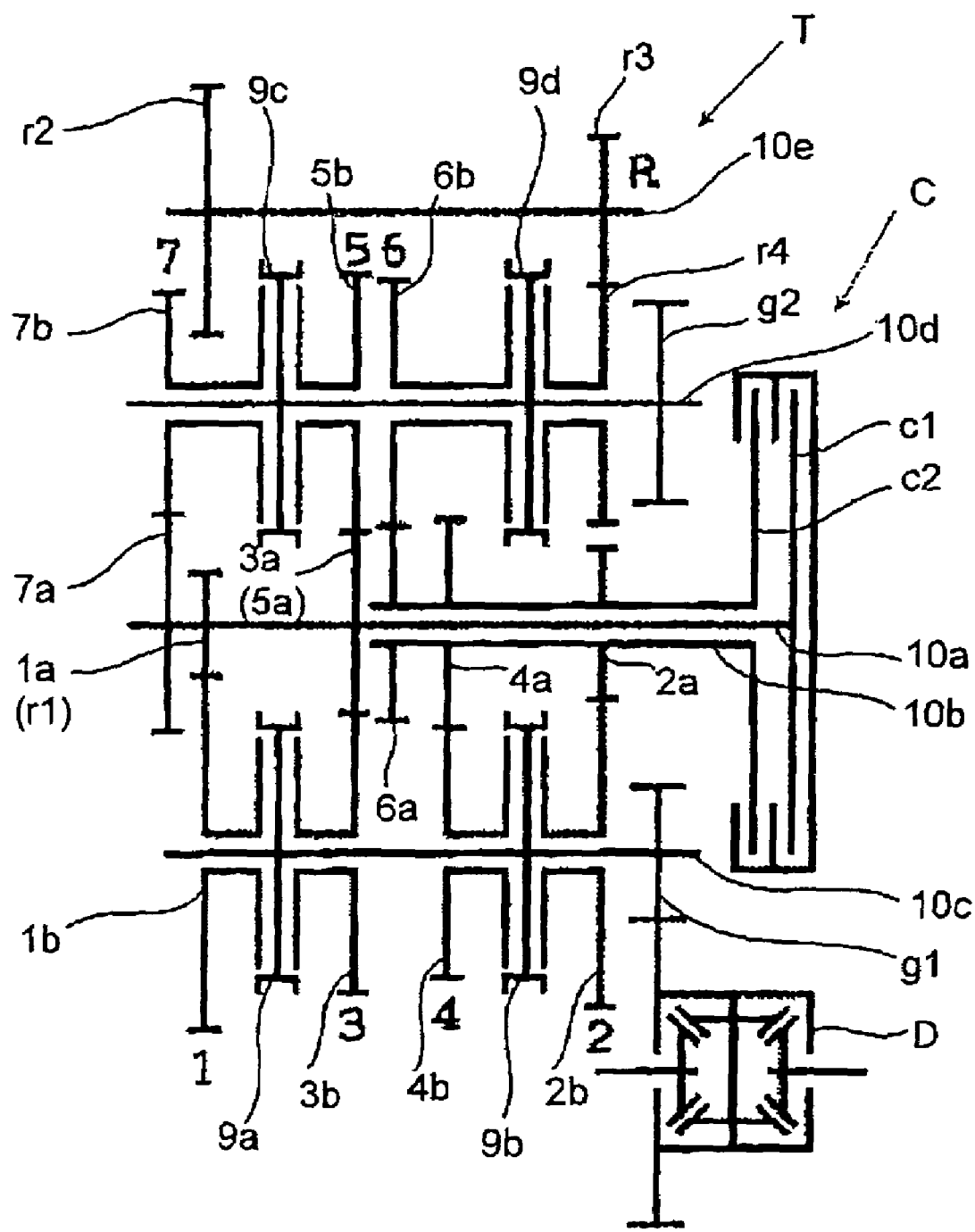
FIG. 1 is a schematic view of a gear train of a transmission to which a shift operating apparatus according to an embodiment of the present invention is applied.
Figure 2:
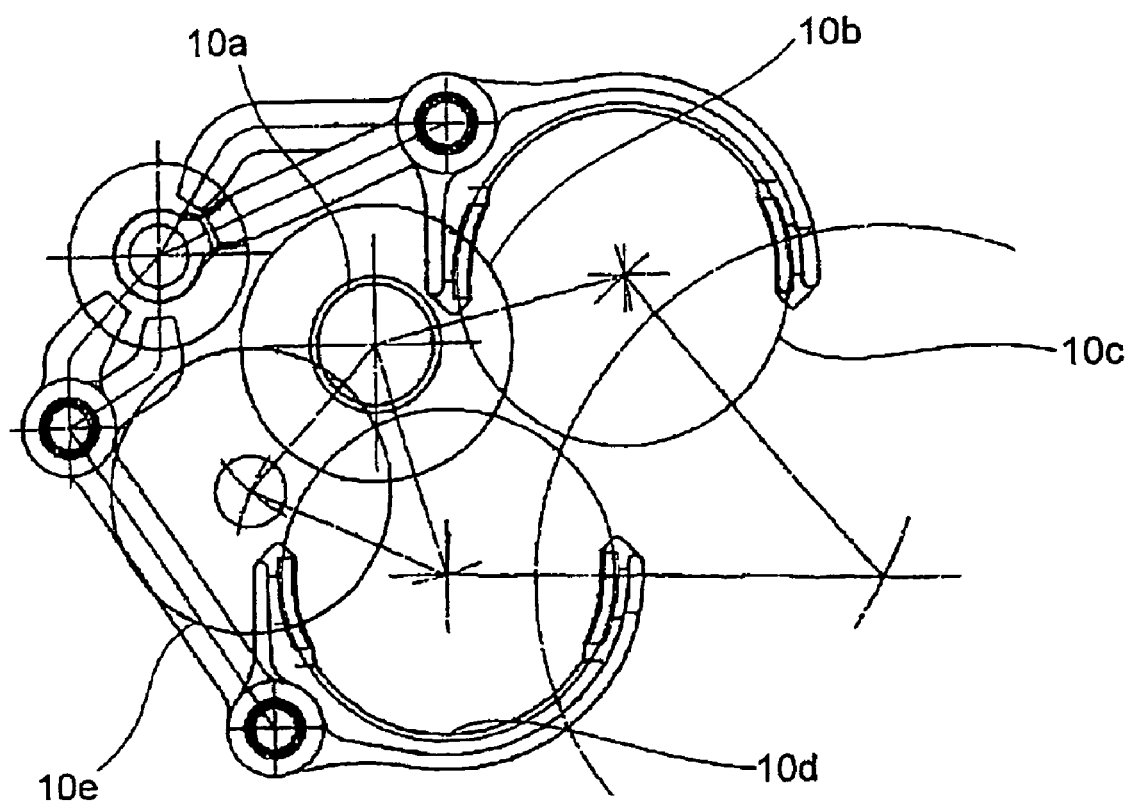
FIG. 2 is a view illustrating a layout of gears of the transmission having the gear train illustrated in FIG. 1, viewing from an axial direction.

An embodiment of the present invention will be explained hereinbelow with reference to the attached drawings With reference to FIGS. 1-2, a synchromesh-type transmission T includes plural synchromesh mechanisms $9a$-$9d$ operated by the shift operating apparatus according to the embodiment of the present invention described below, and a twin clutch mechanism C. In the transmission T, a shift stage is selectively established in response to operations of the synchromesh mechanisms $9a$-$9d$ and the twin clutch mechanism C.

The twin clutch mechanism C includes a first clutch $c1$ and a second clutch $c2$ for selectively transmitting a power to the synchromesh type transmission T from a driving power source such as an engine (not shown) and an electric motor (not shown). The twin clutch mechanism C can be automatically operated, for example by a hydraulic-type apparatus that is activated in synchronization with the shift operating apparatus described below. Further, in some situations, the twin clutch mechanism C can be operated manually.

The synchromesh type transmission T includes a first input shaft $10a$, a second input shaft $10b$, gear-trains respectively employed for establishing shift stages. According to the embodiment of the present invention, the gear-trains include a gear-train 1 for a first shift stage, a gear-train 2 for a second shift stage, a gear-train 3 for a third shift stage, a gear-train 4 for a fourth shift stage, a gear-train 5 for a fifth shift stage, a gear-train 6 for a sixth shift stage, a gear-train 7 for a seventh shift stage and a gear-train R for a reverse shift stage. However, the gear-trains are not limited to the above, and can include gear-trains for other shift stages. The first input shaft $10a$ is transmitted with an engine power through the first clutch $c1$, while the second input shaft $10b$ is transmitted with an engine power through the second clutch $c2$. The gear-trains, which are respectively employed for establishing odd-numbered shift stages such as the first, third, fifth and seventh shift stages, are transmitted with an engine power through the first input shaft $10a$, and the gear-trains, which are respectively employed for establishing even-numbered shift stages such as the second, fourth, sixth, and reverse shift stages, are transmitted with an engine power through the second input shaft $10b$. The first input shaft $10a$ is inserted into and extends in the second input shaft $10b$.

On the first input shaft $10a$, drive gears $1a$ ($r1$), $3a$ ($5a$), and $7a$ respectively for the first, third, fifth and seventh shift stages are mounted so as to integrally rotate with the first input shaft $10a$. The single drive gear $1a$ ($r1$) contributes to establish both the first shift stage and the reverse shift stage, and the single drive gear $3a$ ($5a$) contributes to establish both the third shift stage and the fifth shift stage.

On the second input shaft $10b$, drive gears $2a$, $4a$, and $6a$ for the second, fourth and sixth shift stages are mounted so as to integrally rotate with the second input shaft $10b$.

The synchromesh type transmission T further includes a first intermediate shaft $10c$, a second intermediate shaft $10d$, and a reverse shaft $10e$. The first intermediate shaft $10c$ is idly fitted with driven gears 1b-4b for the first, second, third and fourth shift stages, and is provided with a first output gear g1 for its integral rotation with the first intermediate shaft 10c. The second intermediate shaft 10d is idly fitted with driven gears 5b-7b for the fifth, sixth and seventh shift stages and a fourth reverse shift stage gear r4, and is provided with a second output gear g2 for its integral rotation with the second intermediate shaft 10d. The reverse shaft 10e is provided with second and third reverse shift stage gears r2 and r3. One of the first and second output gears g1 and g2 transmits an output of the synchromesh type transmission T to a differential mechanism D.

The first input shaft 10a, the second input shaft 10b, the first intermediate shaft 10c, the second intermediate shaft 10d, and the reverse shaft 10e are mutually arranged in parallel.

On the first intermediate shaft 10c, mounted are a first and third shift stage synchromesh mechanism 9a and a second and fourth shift stage synchromesh mechanism 9b. On the second intermediate shaft 10d, mounted are a fifth and seventh shift stage synchromesh mechanism 9c, and a sixth and reverse shift stage synchromesh mechanism 9d. The first and third shift stage synchromesh mechanism 9a is arranged between the first driven gear 1b and the third driven gear 3b and is selectively operated to establish one of the first and third shift stages in the transmission. The second and fourth shift stage synchromesh mechanism 9b is arranged between the second driven gear 2b and the fourth driven gear 4b and is selectively operated to establish one of the second and fourth shift stages in the transmission. The fifth and seventh shift stage synchromesh mechanism 9c is arranged between the fifth driven gear 5b and the seventh driven gear 7b and is selectively operated to establish one of the fifth and seventh shift stages in the transmission. The sixth and reverse shift stage synchromesh mechanism 9d is arranged between the sixth driven gear 6b and the fourth reverse shift stage gear r4 and is selectively operated to establish one of the sixth and reverse shift stages in the transmission. In response to at least one of a vehicle speed and a selected shift stage, the shift operating apparatus selectively operates an appropriate synchromesh mechanism from among the aforementioned four synchromesh mechanisms, and the selected synchromesh mechanism rotates an appropriate driven gear integrally with a predetermined shaft.

Figure 4A:
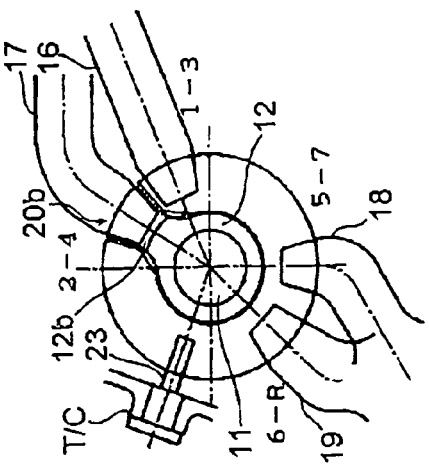
FIG. 4A is a schematic view of an interlock member illustrated in FIG. 3, as seen from an axial direction of a shift and select shaft, in a condition where a first and third shift stage shift fork head is engaged with a shift groove of an inner lever.
Figure 4B:
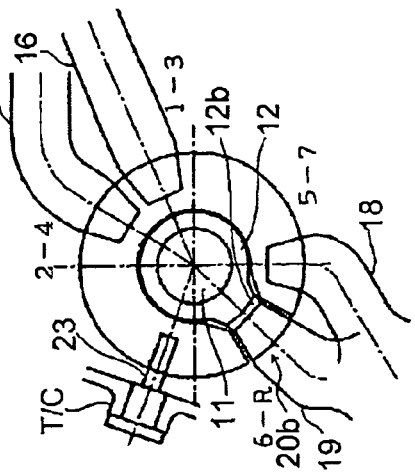
FIG. 4B is a schematic view of the interlock member, as seen from the axial direction of the shift and select shaft, in a condition where a second and fourth shift stage shift fork head is engaged with a shift groove of the inner lever.
Figure 4C:
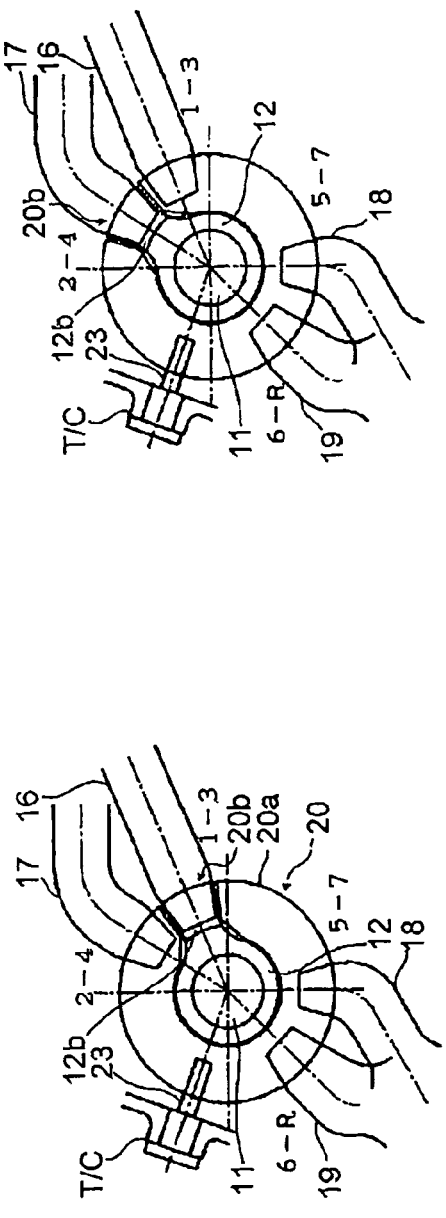
FIG. 4C is a schematic view of the interlock member, as seen from the axial direction of the shift and select shaft, in a condition where a fifth and seventh shift stage shift fork head is engaged with a shift groove of the inner lever.
Figure 4D:
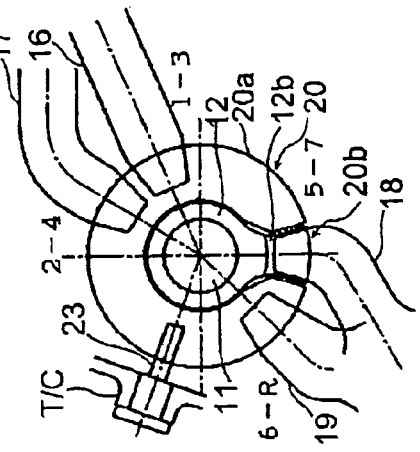
FIG. 4D is a schematic view of the interlock member, as seen from the axial direction of the shift and select shaft, in a condition where a sixth and reverse shift stage shift fork head is engaged with a shift groove of the inner lever.
Figure 6A:
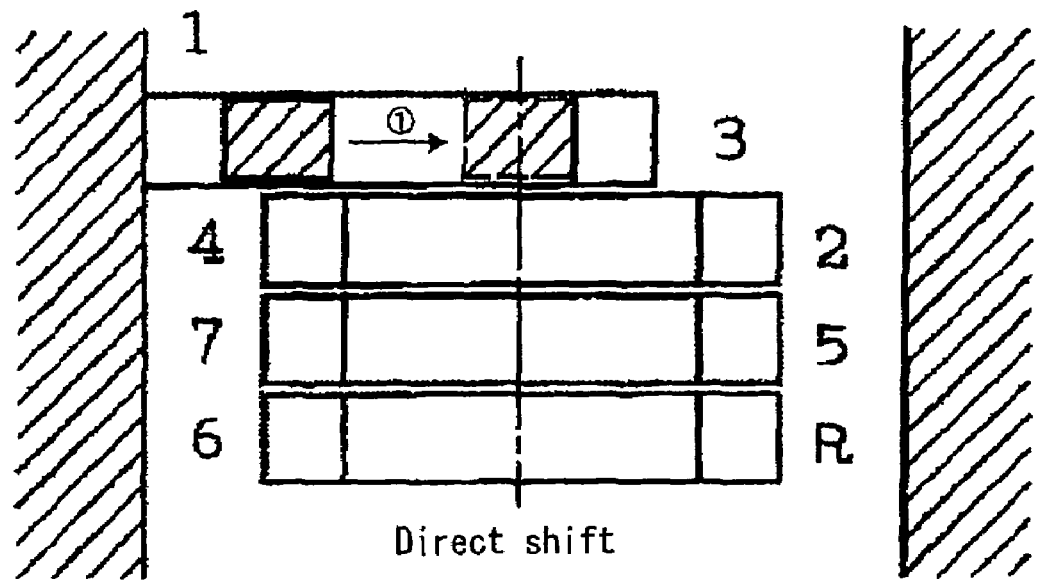
FIG. 6A is a view for explaining a direct shift operation according to a related art.
Figure 6B:
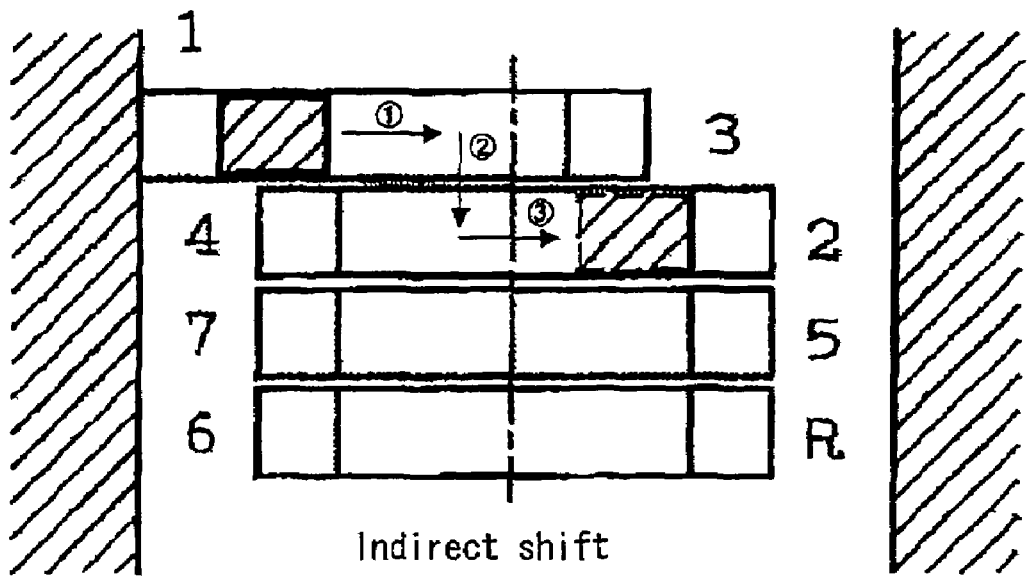
FIG. 6B is a view for explaining an indirect shift operation according to the related art.

The shift operating apparatus according to the embodiment of the present invention, which operates the above-explained transmission, will be explained hereinbelow. The shift operating apparatus operates the synchromesh mechanisms 9a-9d illustrated in FIG. 1 through shift forks (not shown) having shift fork heads 16-19 illustrated in FIG. 4A.

With reference to FIGS. 3 and 4A-4D, the shift operating apparatus includes a shift and select shaft 11, an inner lever 12 provided on the shift and select shaft 11, the plural shift fork heads (a first and third shift stage shift fork head 16, a second and fourth shift stage shift fork head 17, a fifth and seventh shift stage shift fork head 18, and a sixth and reverse shift stage shift fork head 19) 16-19, and plural shift grooves 13-15 formed on the inner lever 12. The shift and select shaft 11 is moved in an axial direction upon a shift operation and is rotated about an axis upon a select operation. The inner lever 12 is shifted in the axial direction upon a shift operation and rotated about the axis upon a select operation. The first and third shift stage shift fork head 16 is selectively operated to establish one of the first and third shift stages in the transmission. The second and fourth shift stage shift fork head 17 is selectively operated to establish one of the second and fourth shift stages in the transmission. The fifth and seventh shift stage shift fork head 18 is selectively operated to establish one of the fifth and seventh shift stages in the transmission. The sixth and reverse shift stage shift fork head 19 is selectively operated to establish one of the sixth and rearward shift stages in the transmission.

Figure 3:
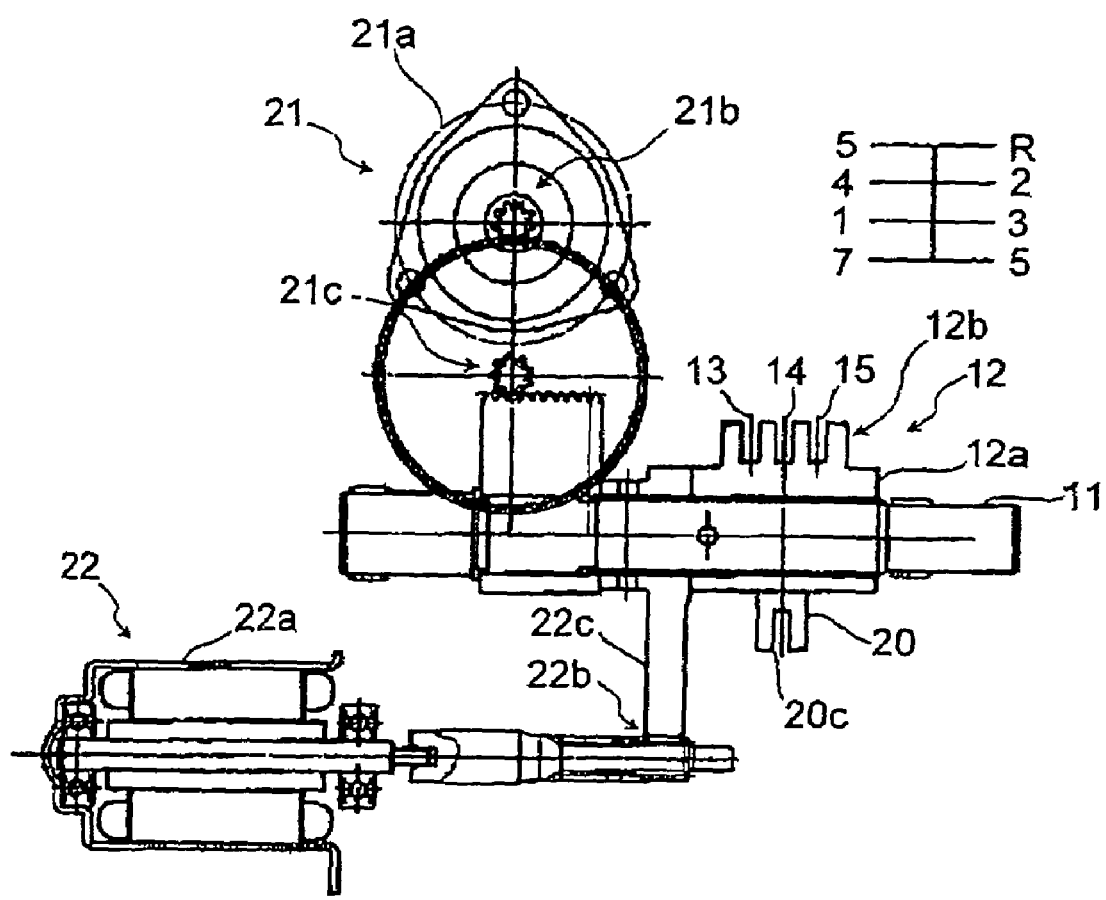
FIG. 3 is a schematic view for explaining a whole structure of the shift operating apparatus according to the embodiment of the present invention.

The shift fork heads 16, 17, 18 and 19 are arranged about the axis along a circumferential direction of the shift and select shaft 11 and are positioned with a predetermined interval relative to an adjacent shift fork head of each other. Each shift groove 13, 14, and 15 opens in the circumferential direction of the shift and select shaft 11, i.e., has openings at both axial sides thereof. The circumferential direction of the shift and select shaft 11, i.e., the lateral direction of the inner lever 12, is illustrated in FIG. 3 and extends in an up-and-down direction of FIG. 3. The circumferential direction of the shift and select shaft 11 is also illustrated in FIG. 5 and extends in a right-and-left direction in FIG. 5. Therefore, in response to at least one of a vehicle speed and a selected shift stage, one of the shift grooves 13-15 is engaged with a predetermined shift fork head out of the plural shift fork heads 16-19. Further, the engagement thereof is released when the inner lever 12, i.e., the shift groove, is rotated about the axis relative to the shift fork head in response to the select operation.

The inner lever 12 includes a hub portion 12a spline-engaged with the shift and select shaft 11, and a lever portion 12b protruding outwardly in a radial direction of the shift and select shaft 11.

The lever portion 12b is formed with the plural shift grooves 13, 14 and 15. Adjacent shift grooves 13 and 14, or 14 and 15 are respectively arranged in a line with an interval therebetween along the axial direction, the interval which substantially corresponds to an amount of a shift stroke.

The shift and select shaft 11 is moved by a shift mechanism 21 in the axial direction and rotated by a select mechanism 22. The shift mechanism 21 converts, via a first gear mechanism 21b and a rack and pinion mechanism 21c, a rotational force of a first motor 21a activated in response to a selected shift stage into a force in the axial direction, and transmits the force to the shift and select shaft 11. The select mechanism 22 transmits, via a second gear mechanism 22b and an oscillating gear 22c, a rotational force of a second motor 22a activated in response to a selected shift stage to the shift and select shaft 11. The shift operating apparatus according to the embodiment of the present invention can be automatically controlled through the first motor 21a of the shift mechanism 21 and the second motor 22a of the select mechanism 22.

The shift operating apparatus further includes an interlock member 20 which is externally provided at the hub portion 12a of the inner lever 12. The interlock member 20 is rotated about the axis together with the inner lever 12 upon a select operation, and is not allowed to move in the axial direction upon a shift operation. The interlock member 20 is mounted on a transmission case T/C (illustrated in FIG. 4) by means of a pin 23 (illustrated in FIG. 4) in such a manner that the interlock member 20 is rotatable on the shift and select shaft 11 about the axis.

As illustrated in FIG. 4, the interlock member 20 includes an approximately annular shaped portion 20a, a split portion 20b formed on the annular-type portion 20a in such a manner to extend in the axial direction, and an interlock groove 20c (FIG. 3) formed on the annular-type portion 20a. The annular-type portion 20a restricts an axial movement of at least one shift fork head from among the plural shift fork heads 16-19, the at least one shift fork head which has not been engaged with any shift groove from among the shift grooves 13-15 and is placed at a shift stage position. The split portion 20b extends in the axial direction, and the lever portion 12b of the inner lever 12 projects thereto. The split portion 20b with the above-described configuration allows an axial movement of a shift fork head from among the shift fork heads 16-19, the shift fork head which has been engaged with an appropriate shift groove out of the shift grooves 13-15. The interlock groove 20c is engaged with at least one shift fork head from among the shift fork heads 16-19, the at least one shift fork head which have not been engaged with any shift groove from among the shift grooves 13-15 and is placed at a neutral position N. The lever portion 12b of the inner lever 12 can be moved inside the split portion 20b of the interlock member 20 in the axial direction. The interlock member 20 can be rotated together with the inner lever 12 when the lever portion 12b of the inner lever 12 contacts with an inner wall of the ring portion 20a, the inner wall by which the split portion 20b is defined.

According to the embodiment of the present invention, a width of each shift groove is identical to a width of the interlock groove 20c in the axial direction, and a width of the annular-type portion 20a is identical to a width between outer walls of each shift groove in the axial direction.

Next, a shift operation (consisting of a shift movement and a select movement) in the transmission illustrated in FIG. 1 by the shift operating apparatus illustrated in FIG. 3 is explained hereinbelow. FIGS. 5A-5W illustrate a transition in a condition of the shift operating apparatus through a sequence of shift operations. The numeral references 1, 2, 3, 4, 5, 6, 7 and R represents first, second, third, fourth, fifth, sixth, seventh and reverse shift stages, respectively. At least one shift fork head from among the plural shift fork heads 16, 17, 18 and 19, the shift fork head which is not necessarily to be shifted or the shift fork head which needs to be prohibited from being operated for a shift movement, can be prevented from moving in both shift directions by being engaged with the interlock groove 20c at the neutral position N or can be prevented from moving to the neutral position N by being impacted with an outer wall surface (i.e., an axial-directional surface) of the annular-type portion 20a at the shift stage position.

[Neutral N]

With reference to FIG. 5A, at a neutral N, the inner lever 12 and the interlock member 20 are positioned at the neutral position N in the shift direction (i.e. the axial direction of the shift and select shaft 11). Further, the first and third shift stage shift fork head 16 is engaged with the shift groove 14, and the second and fourth shift stage shift fork head 17, the fifth and seventh shift stage shift fork head 18, and the sixth and reverse shift stage shift fork head 19 are engaged with the interlock groove 20c. On this occasion, the first clutch c1 and the second clutch c2 illustrated in FIG. 1 are at disengaged states, and the synchromesh mechanisms 9a-9d are placed at the neutral position N.

[Neutral N to First Shift Stage]

With reference to FIGS. 5A and 5B, the inner lever 12 is moved towards a first side (an upper side in FIGS. 5A-5W) at an amount corresponding to a shift stroke upon a shift operation, and the first and third shift stage shift fork head 16 is shifted to a shift position at the first side. Thereby, with reference to FIG. 1, the first and third shift stage synchromesh mechanism 9a is shifted to one side (i.e., to the left side in FIG. 1), and the first driven gear 1b is fixed to the first intermediate shaft 10c. Then, the first clutch c1 is engaged, and the first shift stage is established.

[First Shift Stage to Second Shift Stage]

With reference to FIGS. 5B, 5C and 5D, the inner lever 12 is rotated about the axis upon a select operation, the engagement of the shift fork head 16 and the second shift groove 14 is released, and the second and fourth shift stage shift fork head 17 is engaged with the third shift groove 15. Then, the inner lever 12 is moved towards a second side (a downside in FIGS. 5A-5W) at an amount corresponding to a shift stroke upon a shift operation, and the shift fork head 17 is shifted to a shift position at the second side. Thereby, with reference to FIG. 1, the second and fourth shift stage synchromesh mechanism 9b is shifted to the other side (i.e., to the right side in FIG. 1), and the second driven gear 2b is fixed to the first intermediate shaft 10c. Then, the second clutch c2 is engaged while the first clutch c1 is being disengaged, and the second shift stage is established.

As described above, with the configuration of the shift operating apparatus according to the embodiment of the present invention, a shift operation from the first shift stage to the second shift stage can be completed by a select operation (rotation) and a shift engaging operation (axial movement). Further, a stroke required for the shift engaging operation corresponds to or is satisfied with the shift stroke, that is, a center distance between the adjacent shift grooves 14 and 15. Accordingly, a time required for a gear change operation can be reduced relative to a gear change operation that requires a shift disengaging operation.

[Second Shift Stage to Third Shift Stage]

With reference to FIGS. 5D-5F, the inner lever 12 is rotated about the axis upon a select operation, the engagement of the second shift fork head 17 and the third shift groove 15 is released, and the first and third shift stage shift fork head 16 is engaged with the first shift groove 13. Then the inner lever 12 is moved towards the second side upon a shift operation, and the first and third shift stage shift fork head 16 is shifted to a shift position at the second side. Thereby, with reference to FIG. 1, the first and third shift stage synchromesh mechanism 9a is shifted to the other side, and the third driven gear 3b is fixed to the first intermediated shaft 10c. Then, the first clutch c1 is engaged while the second clutch c2 is being disengaged, and the third shift stage is established.

[Third Shift Stage to Fourth Shift Stage]

With reference to the FIGS. 5F-5H, the inner lever 12 is rotated about the axis upon a select operation, the engagement of the first shift fork head 16 and the first shift groove 13 is released, and the second and fourth shift stage shift fork head 17 is engaged with the first shift groove 13. Then, the inner lever 12 is moved towards the first side upon a shift operation, and the second and fourth shift stage shift fork head 17 is shifted to a shift position at the first side. Thereby, the second and fourth shift stage synchromesh mechanism 9b is shifted to the one side, and the fourth driven gear 4b is fixed to the first intermediated shaft 10c (refer to FIG. 1). Then, the second clutch c2 is engaged while the first clutch c1 is being disengaged, and the fourth shift stage is established.

[Fourth Shift Stage to Fifth Shift Stage]

With reference to FIGS. 5H-5L, the inner lever 12 is rotated about the axis upon a select operation, the engagement of the second and fourth shift stage shift fork head 17 and the first shift groove 13 is released, and the first and third shift stage shift fork head 16 is engaged with the third shift groove 15. Then, the inner lever 12 is moved towards the first side upon a shift operation, the first and third shift stage shift fork head 16 is returned to the neutral position N, and the first and third shift stage synchromesh mechanism 9a is returned to the neutral position N. Further, the inner lever 12 is rotated about the axis upon a select operation, the engagement of the first and third shift stage shift fork head 16 and the third shift groove 15 is released, and the fifth and seventh shift stage shift fork head 18 is engaged with the third shift groove 15. Then, the inner lever 12 is moved towards the second side upon a shift operation, and the fifth and seventh shift stage shift fork head 18 is shifted to a shift position at the second side. Thereby, with reference to FIG. 1, the fifth and seventh shift stage synchromesh mechanism 9c is shifted to the other side, and the fifth driven gear 5b is fixed to the second intermediated shaft 10d. Then, the first clutch c1 is engaged while the second clutch c2 is being disengaged, and the fifth shift stage is established.

[Fifth Shift Stage to Sixth Shift Stage]

With reference to FIGS. 5L-5P, the inner lever 12 is rotated about the axis upon a select operation, the engagement of the fifth and seventh shift stage shift fork head 18 and the third shift groove 15 is released, and the second and fourth shift stage shift fork head 17 is engaged with the first shift groove 13. Then, the inner lever 12 is moved toward the second side upon a shift operation, the second and fourth shift stage shift fork head 17 is returned to the neutral position N, and the second and fourth shift stage synchromesh mechanism 9b is returned to the neutral position N. Further, the inner lever 12 is rotated about the axis upon a select operation, the engagement of the second and fourth shift stage shift fork head 17 and the first shift groove 13 is released, and the sixth and reverse shift fork head 19 is engaged with the first shift groove 13. Then, the inner lever 12 is moved towards the first side upon a shift operation, and the sixth and reverse shift fork head 19 is shifted to a shift position at the first side. Thereby, with reference to FIG. 1, the sixth and reverse synchromesh mechanism 9d is shifted to the one side, and the sixth driven gear 6b is fixed to the second intermediated shaft 10d. Then, the second clutch c2 is engaged while the first clutch c1 is being disengaged, and the sixth shift stage is established.

[Sixth Shift Stage to Seventh Shift Stage]

With reference to FIGS. 5P-5T, the inner lever 12 is rotated about the axis upon a select operation, the engagement of the sixth and reverse shift stage shift fork head 19 and the first shift groove 13 is released, and the fifth and seventh shift stage shift fork head 18 is engaged with the third shift groove 15. Then the inner lever 12 is moved towards the first side upon a shift operation, and the fifth and seventh shift stage shift fork head 18 is shifted to a shift position at the first side. Thereby, with reference to FIG. 1, the fifth and seventh shift stage synchromesh mechanism 9c is shifted to the one side, and the seventh driven gear 7b is fixed to the second intermediated shaft 10d. Then, the first clutch c1 is engaged while the second clutch c2 is being disengaged, and the seventh shift stage is established. Thereafter, the inner lever 12 is rotated about the axis upon a select operation, and the sixth and reverse shift stage shift fork head 19 is engaged with the third shift groove 15. Then, the inner lever 12 is moved towards the second side upon a shift operation, and the sixth and reverse shift stage shift fork head 19 is returned to the neutral position N.

[First Shift Stage to Reverse Shift Stage]

With reference to FIGS. 5U-5W, the first clutch c1 is disengaged in a condition where the first shift stage has been established in the transmission, and the inner lever 12 is rotated about the axis upon a select operation. Thereby, an engagement of the first and third shift stage shift fork head 16 and the second shift groove 14 is released, and the sixth and reverse shift stage shift fork head 19 is engaged with the third shift groove 15. Next, the inner lever 12 is moved towards the second side corresponding to an amount of a shift stroke upon a shift operation, and the sixth and reverse shift stage shift fork head 19 is shifted to a shift position at the second side. Thereby, with reference to FIG. 1, the sixth and reverse shift stage synchromesh mechanism 9d is shifted to the other side, and the fourth reverse gear r4 is fixed to the second intermediated shaft 10d. Then, the first clutch c1 is engaged and the reverse shift stage is established.

According to the embodiment of the present invention, the shift operating apparatus of the present invention is applied for an automated synchromesh type manual transmission which can be mounted on a vehicle. More particularly, the present invention is applied for a twin clutch type manual transmission. However, the present invention is not limited thereto. Alternatively, or in addition, the present invention may be applicable for a single clutch type manual transmission.

According to the embodiment of the present invention, an upshift operation and reverse shift operation are explained. However, the present invention is not limited thereto. Alternatively, or in addition, the present invention may be applicable for a down shift operation.

Further, in the embodiment of the present invention, the shift operation is performed in order of shift stage (e.g., from the first shift stage to the second shift stage, from the second shift stage to the third shift stage, i.e., without skipping any shift stage). However, the present invention is not limited thereto. Alternatively, or in addition, the shift operation may be performed not in order of shift stage (e.g., from the first shift stage to the third shift stage, from the third shift stage to the first shift stage, from the second shift stage to the fourth shift stage, from the fourth shift stage to the second shift stage, i.e., by skipping at least one shift stage).

The shift operating apparatus according to the embodiment of the present invention is applicable for a twin clutch type manual transmission. More particularly, the shift operating apparatus is applicable for an automated twin clutch type manual transmission. The twin clutch type manual transmission includes plural synchromesh mechanisms, plural input shafts, and plural clutches for selectively transmitting the power to the plural input shafts. The twin clutch type manual transmission can perform a shift operation in which a second synchromesh mechanism is operated while a first clutch is being disengaged in a condition where a first synchromesh mechanism has operated.

In the shift operating apparatus according to the embodiment of the present invention, there are three shift grooves provided. That is, the shift operating apparatus can be applied, only with the small number of shift grooves, to a transmission or a transmission apparatus in which there are a neutral position, a shift stage, and another shift stage opposing to the shift stage.

With the configuration of the shift operating apparatus according to the embodiment of the present invention, during a first predetermined shift stage being selected, a shift fork head among from the plural shift fork heads, which is employed for establishing a second predetermined shift stage being different from the first predetermined shift stage, is positioned at a neutral position along the axial direction. Because the shift fork head for the second predetermined shift stage is placed at a distance, corresponding to an amount of a shift stroke along the axial direction, away from a shift fork head for the first predetermined shift stage and the shift groove which is engaged therewith, the shift engaging operation can be performed instantly with almost no idle running time.

According to the embodiment of the present invention, the first and second predetermined shift stages may correspond to lower shift stages. Therefore, a time required for a shift operation can be reduced at lower shift stages, and immediate acceleration can thereby be achieved.

According to the embodiment of the present invention, the inner lever includes the hub portion spline-engaged with the shift and select shaft, and the lever portion protruding outwardly in a radial direction of the shift and select shaft from the hub portion. The lever portion is formed with plural shift grooves at the protruded part thereof along the axial direction. The plural shift grooves are rotated about the axis upon a select operation and one of the plural shift grooves is engaged with a shift fork head for a selected shift stage. With the configuration of the shift operating apparatus according to the embodiment of the present invention, the shift grooves can be formed without difficulty and the inner lever can be reduced in size.

The shift operating apparatus includes the interlock member externally provided at the hub portion of the inner lever. The interlock member is rotated about the axis together with the inner lever upon a select operation, and is not allowed to move in the axial direction upon a shift operation. The interlock member includes the approximately annular shaped portion, the split portion formed on the annular-type portion in such a manner to extend in the axial direction, and the interlock groove formed on the annular-type portion in such a manner to extend around an axis of the shift and select shaft. The annular-type portion restricts an axial movement of at least one shift fork head from among the plural shift fork heads, the at least one shift fork head which has not been engaged with any shift groove from among the shift grooves and is placed at a shift stage position. The split portion extends in the axial direction, and the inner lever projects thereto. The split portion with the above-described configuration allows an axial movement of a shift fork head from among the shift fork heads, the shift fork head which has been engaged with an appropriate shift groove out of the shift grooves. The interlock groove is engaged with at least one shift fork head from among the shift fork heads, the at least one shift fork head which have not been engaged with any shift groove from among the shift grooves and is placed at a neutral position. With the configuration of the shift operating apparatus according to the embodiment of the present invention, it is possible to avoid an erroneous shifting of an inappropriate shift fork head whenever a shift operation is implemented.

With the configuration of the shift operating apparatus according to the embodiment of the present invention, the width of each shift groove is identical to the width of the interlock groove in the axial direction. Further, a width defined between both axial-side outer walls of the each shift groove is identical to a width defined between both axial-side outer walls of the each interlock groove. Therefore, a preferable interlock member can be supplied.

With the configuration of the transmission apparatus according to the embodiment of the present invention, the clutch mechanism includes the first and second clutches for selectively transmitting the power. The synchromesh type transmission mechanism includes the first input shaft which is transmitted with an engine power from the first clutch while the second input shaft is transmitted with an engine power from the second clutch. The synchromesh type transmission mechanism further includes the gear-trains for odd-numbered shift stages such as first, third, fifth and seventh shift stages which are transmitted with an engine power through the first input shaft, and the gear-trains for even-numbered shift stages such as second, fourth, and sixth and rearward shift stages which are transmitted with an engine power through the second input shaft. With the above-described configuration, a time required for changing a gear from a predetermined odd-numbered shift stage to a predetermined even-numbered shift stage can be reduced. Further, the clutch mechanism may be automatically controlled by means of the oil pressure mechanism, or the like.

According to the embodiment of the present invention, at the time of a shift operation in which a first shift stage is shifted to a second shift stage, a shift groove for the first predetermined shift stage is placed at the shift stage position and is engaged with a shift fork head for the first shift stage. In such circumstances, a shift groove for the second shift stage is placed at the neutral position, the neutral position being away from the shift groove for the first shift stage corresponding to an amount of a shift stroke. Therefore, a shift fork head for the second shift stage can be selected, i.e., the shift fork head for the second shift stage can be engaged with the shift groove for the second shift stage by only rotating the shift and select shaft. Accordingly, the shift operating apparatus according to the embodiment of the present invention has a minimum idle running distance at the time of the above described shift operation from the first shift stage to the second shift stage, and offers a condition in which a shift operation can instantly be performed. Therefore, the user can obtain a comfortable sense of use.

Further, the above-explained transmission apparatus includes plural clutches. Therefore, a select operation can be performed, by disengaging one of the plural clutches, even in a condition where the shift fork head is placed at the shift position and the synchromesh mechanism connected thereto is operated.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A shift operating apparatus comprising:
   a shift and select shaft moved in an axial direction upon a shift operation and rotated about an axis upon a select operation;
   an inner lever provided at the shift and select shaft, the inner lever being moved in the axial direction upon the shift operation and being rotatable about the axis upon the select operation;
   a plurality of shift fork heads arranged about the axis along a circumferential direction of the shift and select shaft with a predetermined interval relative to an adjacent shift fork head of each other; and
   plural shift grooves formed at the inner lever to be open in the circumferential direction of the shift and select shaft, a shift groove from among the plural shift grooves being engageable with a corresponding shift fork head from among the shift fork heads in response to a selected shift stage, and the engagement between the shift groove and the corresponding shift fork head configured to be released when the inner lever is rotated about the axis in response to the select operation,
   wherein the plural shift grooves are arranged along the axial direction with an interval relative to an adjacent shift groove of each other, the interval which corresponds to an amount of a shift stroke.

2. The shift operating apparatus according to claim 1, wherein the plural shift grooves include at least three shift grooves.

3. A transmission operated by the shift operating apparatus according to claim 2 comprising:
   a plurality of synchromesh mechanisms operated in response to operation of the shift fork heads;
   a clutch mechanism having a plurality of clutches for selectively establishing a transmitting path of a power; and
   plural gear trains by which a shift stage is established in response to the operation of the synchromesh mechanisms and the clutch mechanism.

4. The shift operating apparatus according to claim 1, wherein, during a first predetermined shift stage being selected, a shift fork head from among the plural shift fork heads, which is employed for establishing a second predetermined shift stage being different from the first predetermined shift stage, is positioned at a neutral position along the axial direction.

5. The shift operating apparatus according to claim 4, wherein the first and second predetermined shift stages correspond to lower shift stages.

6. A transmission operated by the shift operating apparatus according to claim 5 comprising:
   a plurality of synchromesh mechanisms operated in response to operation of the shift fork heads;
   a clutch mechanism having a plurality of clutches for selectively establishing a transmitting path of a power; and
   plural gear trains by which a shift stage is established in response to the operation of the synchromesh mechanisms and the clutch mechanism.

7. A transmission operated by the shift operating apparatus according to claim 4 comprising:
   a plurality of synchromesh mechanisms operated in response to operation of the shift fork heads;
   a clutch mechanism having a plurality of clutches for selectively establishing a transmitting path of a power; and
   plural gear trains by which a shift stage is established in response to the operation of the synchromesh mechanisms and the clutch mechanism.

8. The shift operating apparatus according to claim 1, wherein
   the inner lever includes:
      a hub portion spline-engaged with the shift and select shaft; and
      a lever portion protruding from the hub portion outwardly in a radial direction of the shift and select shaft, wherein the plural shift grooves are arranged in a line along the axial direction at a protruding portion of the lever portion.

9. The shift operating apparatus according to claim 8, further comprising:
   an interlock member provided at the hub portion of the inner lever, the interlock member being rotatable about the axis with the inner lever upon the select operation and prohibited from moving in the axial direction upon the shift operation, wherein
   the interlock member includes:
      an annular shaped portion configured to restrict an axial movement of at least one shift fork head from among the plurality of shift fork heads, the at least one shift fork head which has not been engaged with any shift groove from among the shift grooves and is placed at a shift stage position;
      a split portion formed at the annular shaped portion and having the lever portion of the inner lever inserting thereinto, the split portion extending in the axial direction so as to allow an axial movement of the shift fork head being engaged with the shift groove; and
      an interlock groove formed at the annular shaped portion and extending along the circumferential direction of the shift and select shaft, wherein the interlock groove is configured to be engaged with a shift fork head among from the plural shift fork heads which is at a neutral position.

10. The shift operating apparatus according to claim 9, wherein a width of the each shift groove is identical to a width of the interlock groove in the axial direction, and a width defined between both axial-side outer walls of the each shift groove is identical to a width defined between both axial-side outer walls of the interlock groove.

11. A transmission operated by the shift operating apparatus according to claim 10 comprising:
   a plurality of synchromesh mechanisms operated in response to operation of the shift fork heads;
   a clutch mechanism having a plurality of clutches for selectively establishing a transmitting path of a power; and
   plural gear trains by which a shift stage is established in response to the operation of the synchromesh mechanisms and the clutch mechanism.

12. A transmission operated by the shift operating apparatus according to claim 9 comprising:
   a plurality of synchromesh mechanisms operated in response to operation of the shift fork heads;
   a clutch mechanism having a plurality of clutches for selectively establishing a transmitting path of a power; and
   plural gear trains by which a shift stage is established in response to the operation of the synchromesh mechanisms and the clutch mechanism.

13. A transmission operated by the shift operating apparatus according to claim 8 comprising:
   a plurality of synchromesh mechanisms operated in response to operation of the shift fork heads;
   a clutch mechanism having a plurality of clutches for selectively establishing a transmitting path of a power; and
   plural gear trains by which a shift stage is established in response to the operation of the synchromesh mechanisms and the clutch mechanism.

14. A transmission operated by the shift operating apparatus according to claim 1 comprising:
   a plurality of synchromesh mechanisms operated in response to operation of the shift fork heads;
   a clutch mechanism having a plurality of clutches for selectively establishing a transmitting path of a power; and
   plural gear trains by which a shift stage is established in response to the operation of the synchromesh mechanisms and the clutch mechanism.

15. The transmission according to claim 14, further comprising:
   the clutch mechanism including a first clutch and a second clutch and selectively establishes a transmission path of a power by operating the first and second clutches;
   a first input shaft transmitted with a power through the first clutch;
   a second input shaft transmitted with a power through the second clutch;
   the plural gear trains including a gear-train for an odd-numbered shift stage configured to be transmitted with a power through the first input shaft; and a gear-train for an even-numbered shift stage configured to be transmitted with a power through the second input shaft.

* * * * *